United States Patent [19]

Wood, Jr. et al.

[11] Patent Number: 4,525,743
[45] Date of Patent: Jun. 25, 1985

[54] DARK CURRENT MEASUREMENT AND CONTROL FOR CAMERAS HAVING FIELD-TRANSFER CCD IMAGERS

[75] Inventors: Robert F. Wood, Jr., Lansdowne Borough, Pa.; John F. Monahan, Marlton; Peter A. Levine, West Windsor Township, Mercer County, both of N.J.

[73] Assignee: RCA Corporation, Princeton, N.J.

[21] Appl. No.: 594,400

[22] Filed: Mar. 28, 1984

[51] Int. Cl.³ .............................................. H04N 5/16
[52] U.S. Cl. .................................... 358/213; 358/221
[58] Field of Search ............... 358/211, 212, 213, 221, 358/222; 357/24 LR

[56] References Cited

U.S. PATENT DOCUMENTS

3,737,571 6/1973 Gaebele et al. ...................... 358/221
4,462,047 7/1984 Fujimoto et al. .................... 358/212

Primary Examiner—Gene Z. Rubinson
Assistant Examiner—Robert Lev
Attorney, Agent, or Firm—Eugene M. Whitacre; Peter M. Emanuel; Lawrence C. Edelman

[57] ABSTRACT

Output signal samples from a solid-state imager, responsive to dark currents accumulated therein, are applied to slope responsive circuitry for generating a signal which can be used, for example, for field shading correction or imager temperature control. Dark current slope responsive measuring circuitry is particularly advantageous over prior dark current measuring circuitry since it is uneffected by DC offset of the dark current signal which results from imager mask misregistration or carrier diffusion when receiving radiant energy.

21 Claims, 8 Drawing Figures

DARK CURRENT MEASUREMENT AND CONTROL FOR CAMERAS HAVING FIELD-TRANSFER CCD IMAGERS

The present invention relates to solid-state imagers of the charge coupled device (CCD) type used in television cameras and, more particularly, to the problem of accurately measuring integrated dark currents in such imagers to form a control signal.

BACKGROUND OF THE INVENTION

A vertical field-transfer type of CCD imager has an A register exposed to illumination (radiant energy reflected from a scene) and has B and C registers masked from illumination. Radiant energy descriptive of the scene is focused onto the A register during an image integration interval (corresponding substantially to a vertical trace period) to generate charge packets descriptive of a field of video samples. These charge packets are shifted to the B register during a field transfer interval (commonly called a "pull-down" interval) occurring within the subsequent vertical retrace period. The field of video samples thus stored in the B register is progressively shifted to the C register one line each horizontal retrace and then read out serially during the following horizontal trace period while a new field of charge packets is being generated in the A register to be read out during the next vertical trace period.

As noise levels in CCD imagers are reduced, making it feasible to use them in a broadcast-quality television camera system, it becomes desirable to obtain an indication or control signal responsive solely to the integrated dark currents. Dark currents are temperature-dependent black level currents which occur in solid-state imagers, and accumulate as charge in the signal handling portion of the imager, and which appear as signal even in the absence of light. The indication signal can be used for reducing the effects of such integrated dark currents which undesirably accompany the video signals derived from the CCD imager. For example, black level correction signals derived in response to the indication signal can be differentially combined with image-responsive signals having undesirably accompanying integrated dark current responses (commonly called "field shading") to obtain image-responsive signals substantially free of integrated dark current response. Additionally, it is known to be desirable to cool solid-state imagers to reduce the level of temperature-sensitive noise, including integrated dark currents. It has been found that reducing the temperature of the imager to about +10 degrees C. from normal operating temperatures will reduce noise attributed to dark currents fourfold. Cooling of the imager may be accomplished by a thermoelectric cooler, which is a solid-state device through which current is passed in order to pump thermal energy away from a cooled surface. Integrated dark currents can be sensed for providing an indication signal representative of imager temperature or directly indicative of dark current. In a portable television camera including a thermoelectrically cooled solid-state imager, the cooler places a power demand on the camera battery which reduces operating time. The indication signal can be used by a thermal servomechanism for controlling the current draw of the thermoelectric cooler.

Consequently, it is desirable to provide an indication signal responsive to integrated dark currents for use by the camera processing circuitry for purposes such as field shading correction and thermoelectric cooler control. Unfortunately, in a field-transfer type of imager, the masked B register is subject to partial illumination due to, for example, mask misalignment or carrier diffusion. Partial illumination of the B register generates signals which may undesirably be detected during dark current measurement and result in an erroneous dark current measurement.

It is an object of the present invention to provide an accurate indication signal of imager dark current independent of such light contamination of a masked portion of the imager.

SUMMARY OF THE INVENTION

In a television camera including a CCD imager of the field-transfer type an indication signal is provided which is responsive to the slope of an integrated dark current signal supplied at the output of the imager during the field transfer (pull-down) interval.

DETAILED DESCRIPTION

Figure 1:
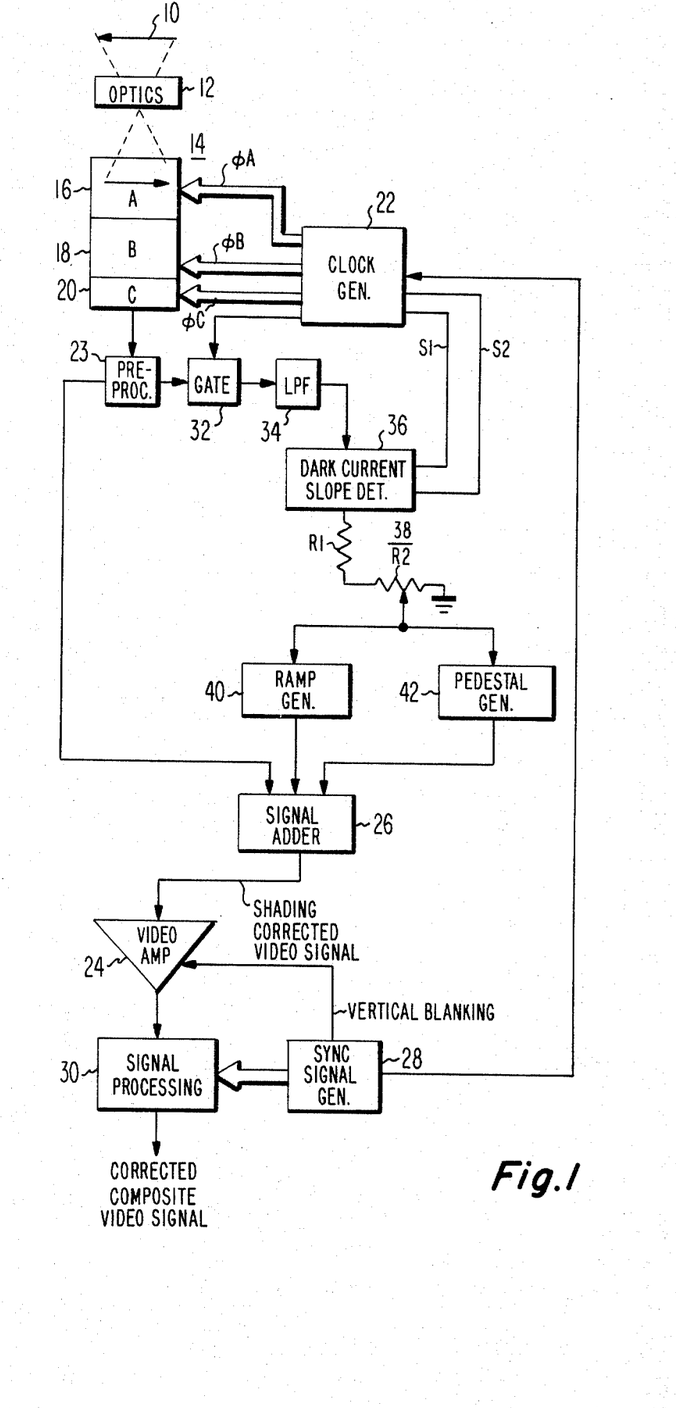
FIG. 1 illustrates in block diagram form a portion of a CCD camera including a dark current slope detector which provides an indication signal in accordance with the invention for the purpose of field shading correction.

In the camera of FIG. 1, radiant energy reflected or transmitted from an object 10 is focused by camera optics 12 onto the surface of a solid-state imager 14. Imager 14 is shown as a conventional CCD (charge-coupled device) imager of the vertical field-transfer type including an unmasked A register portion 16 responsive to radiant energy focused onto it by optics 12 and masked B and C register portions 18 and 20 substantially unresponsive to radiant energy. Photoelectrons are generated in A register 16 in response to the focused radiant energy and accumulate as charge samples descriptive of object 10 and are constrained to specific locations by electrodes (not shown) arranged in horizontal rows (not shown) and channel stop regions arranged in vertical columns (not shown).

Figure 2:
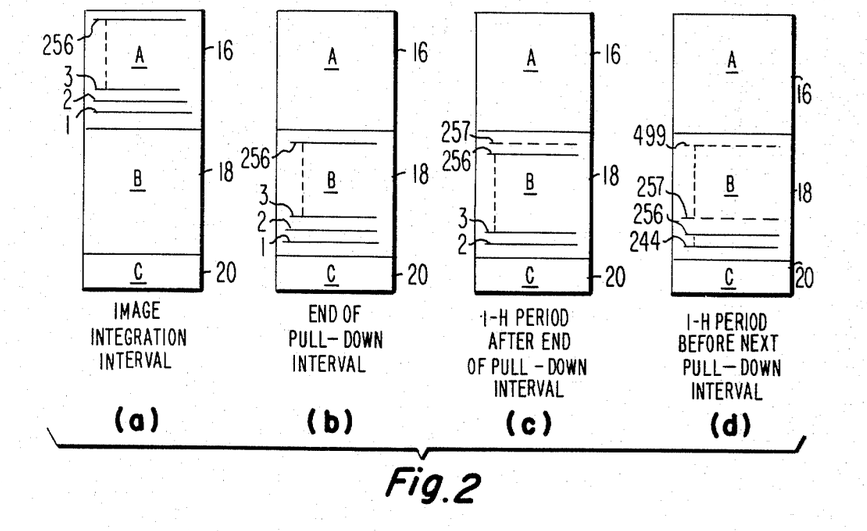
FIG. 2 illustrates charge sample movement in a field-transfer type cf solid-state imager.

Vertical motion of the accumulated charge samples representative of object 10 is controlled by clock voltages $\phi_A$ and $\phi_B$, which may be uniphased or polyphased in nature, applied from a clock generator 22 to the electrodes of A register 16 and B register 18, respectively, of imager 14. During an image integrating period (e.g., corresponding to the vertical trace period of the NTSC television standard) the $\phi_A$ clocks are interrupted and radiant energy responsive charge samples are developed in A register 16. FIG. 2a illustrates the development of a field of charge samples comprising 256 horizontal lines. After the integration period, the accumulated charge samples are transferred in parallel down the vertical channels from A register 16 to B register 18 by synchronous application of the $\phi_A$ and $\phi_B$ clock signals, respectively. As previously noted, this transfer period is commonly called the "pull-down" interval and occurs within the television vertical retrace period. The condition of the imager at end of the pull-down interval is shown in FIG. 2b which illustrates the complete transfer of 256 lines of charge samples from A register 16 to B register 18, thereby leaving the A register empty or devoid of signal-representative charge. During the following image integration interval, wherein the next field of charge samples is being developed in A register 16, the prior field of charge samples is transferred one row (one line) at a time, in parallel form, from B register 18 to the one-line C register 20. By application of the $\phi_C$ clock signals, the charge samples of each line transferred into C register 20 are readout in serial fashion during successive horiozntal trace periods. In the NTSC television system, a visible (active) field comprises approximately 244 lines. The line-by-line transfer of the 244 lines is illustrated in FIGS. 2c and 2d. A progressively increasing number of lines in B register 18 which follow line 256 are devoid of image representative charge and are indicated as dashed lines 257 to 499.

Charge samples supplied at the output of C register 20 are applied to a pre-processor 23 including known noise-reduction and pre-amplifier circuitry such as correlated double sampling, for developing video output signals. Details of circuitry for performing correlated double sampling can be found at pages 552–559 in a book entitled "SOLID STATE IMAGING", by Jespers, Van de Wiele and White published by Noordhoff-Leyden in 1976. The video output signals are applied to a video amplifier 24 via a signal adder 26. The function of signal adder 26 is described below. A synchronizing signal generator 28 develops conventional horizontal and vertical synchronizing, blanking and equalizing signals and supplies timing signals to clock generator 22. Video amplifier 24 is responsive to the vertical blanking signals from generator 28 for blanking output signal from pre-processor 23 during the vertical retrace interval so as to suppress spurious responses of the imager output during vertical retrace.

A signal processor 30 is responsive to the signals generated by synchronizing signal generator 28 for inserting synchronizing, blanking and equalizing signals into the video signal provided by video amplifier 24. Signal processor 30 also includes video signal processing circuitry for providing black-level and gamma correction and other types of conventional signal processing for developing at its output a composite video signal such as an NTSC signal. A PAL or SECAM signal could also be supplied if imager 14 had an appropriate number of lines. If, for example, a color filter (not shown) is included in optics 12, signal processor 30 would also include decoder, matrixing and subcarrier circuitry for developing a color component of the composite video signal at its output.

As previously noted, field transfer imagers are subject to undesirable field shading (shading or background signal level change which occurs across the entire raster) due to dark currents integrated within the imager which accompany the developed video samples. The dark current response of field transfer imagers, as well as other types of imagers, has a direct (DC) component attributable to integration of dark current in the A register over the image integration (field) interval, illustrated by waveform 310 of FIG. 3. Since imager dark currents are temperature-dependent, the amount of field shading is also temperature-dependent. Its variation with temperature is indicated by a two headed arrow.

Furthermore, in field transfer imagers, the line-by-line transfer of video representative charge samples from B register 18 to C register 20 results in a staircase component of integrated dark current response having line-length steps which accompany the video signal. This staircase component has a minimum value at line 1 (the first line read from the B register) and a maximum value at line 244 (the last visible line read from the B register). The generation of this increasing staircase component is readily understood by referring to FIGS. 2b, 2c and 2d. As illustrated therein, line 1 is clocked out by the C register almost immediately after the pull-down interval, thus having a minimum time in which to accumulate dark current response. On the other hand, successively increasing numbered lines remain in B register 18 for increasing numbers of horizontal trace periods. For example, line 244 is supplied from C register 20 almost 1/60th of a second after line 1 and thus has integrated 244 times more dark current while in B register 18 than had line 1. This staircase component of dark current response accompanying the charge causes a slope in average brightness of the generated video signal which is perpendicular to the direction of line scan, commonly called field shading. The field shading is illustrated by waveform 312 of FIG. 3 (individual steps not shown). The slope of the field shading is temperature dependent, as indicated by a double-headed arrow on waveform 312. The combined effect of these imager dark current currents is illustrated by waveform 314 and results in an objectionably noticeable field shading.

U.S. patent application Ser. No. 571,719 entitled, "Dark Current Regulation in Solid-State Devices", filed Jan. 18, 1984, in the name of P. A. Levine, and assigned as is the present application, to RCA Corporation, describes a method of measuring integrated dark current responses for developing an indication signal which is used for controlling power to a thermoelectric cooler. The indication signal as described therein is generated by clocking the C register during the pull-down interval (i.e., after most the video-representative charge samples, 244 lines, have been clocked from the B register) so as to supply at its output a signal intended to be substantially representative of only remnant dark current from the B register. Similarly, in the present invention the remnant dark current signal results from clocking C register 20 during the pull-down interval and is illustrated by waveform 316 of FIG. 3. Waveform 316 includes a substantially ramp-like portion R riding on a DC pedestal portion P and has a duration equal to the pull-down interval. The ramp portion has a maximum level at the beginning of the pull-down interval and a minimum level at the end of the pull-down interval. Although not illustrated on waveform 316, its slope is initially distorted due to the readout of 12 lines of video representative charge samples (line 245–256) which preceed the lines of remnant dark current. The negative slope of waveform 316 is more readily understood by referring to FIGS. 2c and 2d which, as previously noted, illustrate by dashed lines the development of 244 lines (lines 257–499) of remnant or accumulated dark current signal which increments one line at a time behind line 256 during the vertical trace period as 244 lines of B register 18 containing video representative charge samples are transferred to C register 20. At the time illustrated in FIG. 2d, one horizontal trace period (1-H) before the next pull-down interval, dark current line 257 has been accumulating dark current response for almost 1/60 of a second, while line 500 was just developed. Thus, newly developed line 500 has only 1/244th of the level of dark current accumulated therein compared with line 257, which has existed in the B register for almost a full field interval.

The pedestal portion P is the result of radiant energy leakage onto the B register due to, for example, B register mask misalignment or carrier diffusion in the vertical direction from A register 16 into B register 18. Each line following line 256 includes a small DC level due to radiation leakage onto that particular line during a given field, which chiefly results from leaking around the mask over the B register and into the B register region successively occupied by newly forming lines. This results in a substantial scene and device dependent DC level when the accumulated signals from remnant dark current lines 257–499 are used for generating the indication signal. Consequently, the level of the pedestal portion P varies in response to the changing amount of radiant energy reflected or transmitted from various objects focused on imager 14 during each of the vertical intervals and falling near the interface between A register 16 and B register 18. Note that the pedestal portion of the remnant dark current signal as described above is totally independent of the dark current DC pedestal generated in A register 16 during the field interval simultaneously with the video charge samples (i.e., waveform 312).

Figure 3:
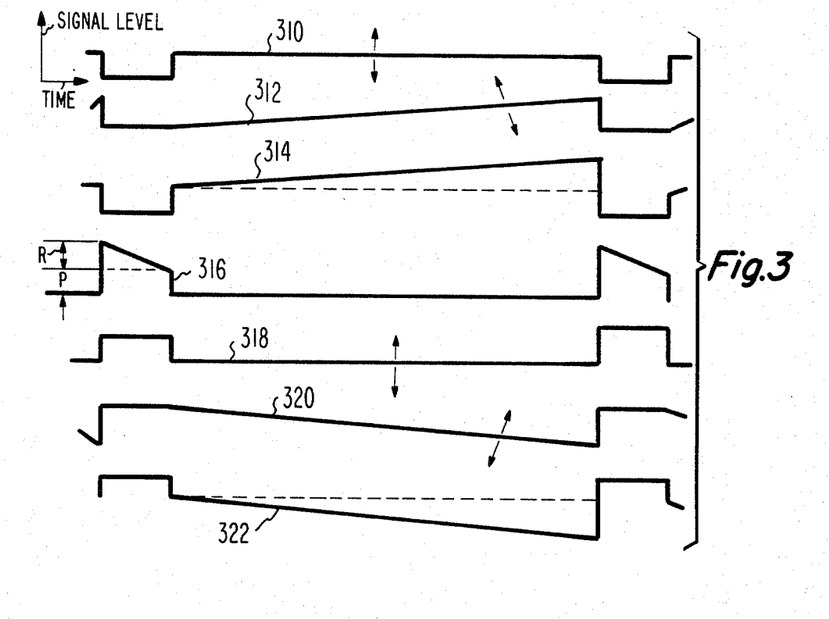
FIG. 3 illustrates various amplitude-time waveforms useful for understanding the principles of the invention.

In the system of the above-noted Levine patent application, the total area under the ramp portion of waveform 316 of FIG. 3 is integrated for deriving a signal level indicative of the amount of accumulated dark current response and therefore also representative of imager temperature. The present inventors however, have found that when there is a varying level of the pedestal portion of the remnant dark current signal, this integration technique for dark current measurement or temperature indication, is therefore inaccurate for conditions of light and/or charge crosstalk to the B register.

Consequently, in accordance with the principles of the present invention, the slope of the remnant dark current signal supplied from C register 20 during the pull-down interval is sensed for accurately developing the indication signal. This dark current measurement technique is unaffected by B register mask misregistration or carrier diffusion since, as illustrated by waveform 316, the slope of ramp portion R is substantially unaffected by the varying level of pedestal portion P.

Figure 8:
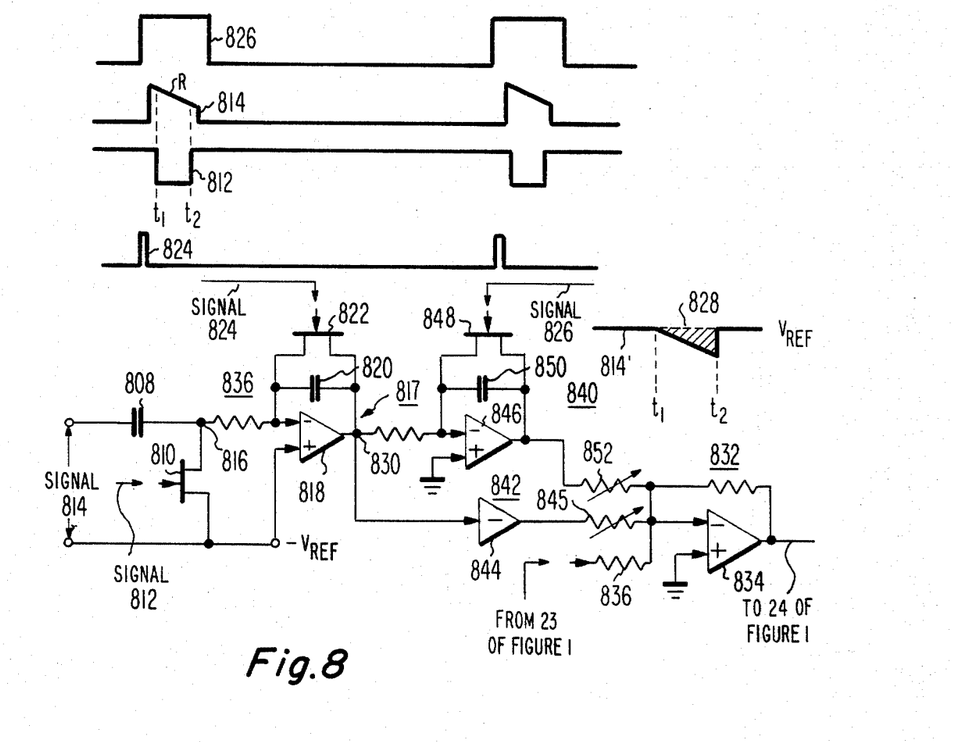
FIG. 8 illustrates another embodiment of a slope detector in accordance with the invention, and waveforms to aid in understanding its operation.

Referring again to FIG. 1, a gate 32 is responsive to signals from generator 22 for passing to the input of a low pass filter (LPF) 34 only the remnant dark current signal supplied from pre-processor 23 during the pull-down interval. Filter 34 smooths out the line-by-line step increments of remnant dark current and supplies a signal, such as illustrated by waveform 316 of FIG. 3, to the input of a slope detector 36. Detector 36 may comprise circuitry such as illustrated in FIGS. 4, 5 or 8 (described below) which provides a DC signal in response to a measure of the slope of ramp portion R of the remnant dark current signal.

A gain control arrangement 38 including a fixed resistor R1 and a variable resistor R2 is adjusted during camera manufacture to take into account device gain variations to imager dark current response resulting from process variations during imager fabrication. A ramp generator 40 and pedestal generator 42 are responsive to the signal at the wiper of resistor R2 for generating field duration ramp and pedestal correction signals, such as illustrated by waveforms 318 and 320 of FIG. 3, having a slope and DC level, respectively, controlled (as indicated by the double headed arrows) by the DC signal. Thus, the generated ramp and pedestal signals have an amplitude and a polarity which tracks the temperature-dependent imager dark currents (illustrated by waveforms 310 and 312) such that when combined by adder 26 with the output video signal from pre-processor 23, undesirable field shading due to integrated dark current response is substantially cancelled. The composite field shading correction signal is illustrated by waveform 322 of FIG. 3. Details of circuitry suitable for generating and combining ramp and pedestal signals with the imager output signal are described in conjunction with FIG. 8.

Figure 4:
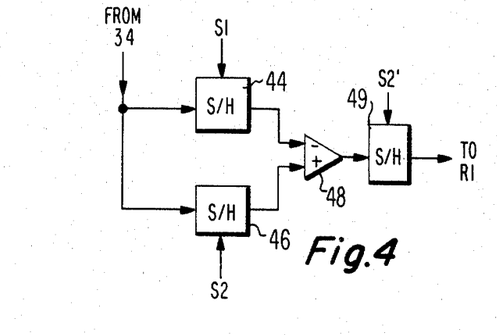
FIG. 4 illustrates in block diagram form a dark current slope detector constructed in accordance with the principles of the invention.

FIG. 4 illustrates one embodiment of a suitable slope indicator including two sample and hold (S/H) circuits 44 and 46 having outputs coupled to the differential inputs of a difference amplifier 48. S/H 44 is responsive to a sample pulse S1 supplied from clock generator 22 occurring near the beginning of the pull-down interval for sampling the remnant dark current signal and supplying the sampled signal level to the inverting input of amplifier 48. S/H 46 is responsive to a sample pulse S2 supplied from clock generator 22 occurring near the end of the pull-down interval for sampling the remnant dark current signal and supplying the sampled signal level to the non-inverting input of amplifier 48. After the occurrence of the S2 pulse, amplifier 48 generates an output signal representing the difference (i.e. slope) between these two signal levels. A final S/H 49 is responsive to a slightly delayed S2 pulse, indicated as S2', for sampling the output signal of amplifier 48 and providing to resistor R1 a signal level representative of the slope of the integrated dark current ramp.

Figure 5:
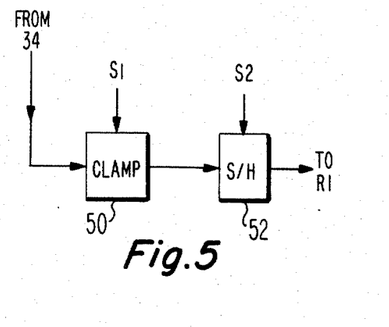
FIG. 5 illustrates in block diagram form an alternative embodiment of a dark current slope detector constructed in accordance with the principles of the invention.

FIG. 5 illustrates an alternative embodiment of a suitable slope detector and includes a clamp 50 followed by a sample and hold circuit 52. Clamp 50 is responsive to a pulse such as the S1 sampling pulse for clamping the remnant dark current signal to a predetermined reference level, such as signal ground, near the beginning of the pull-down interval. Near the end of the pull-down interval S/H 52 is responsive to the S2 pulse for sampling the remnant dark current signal for providing to resistor R1 a signal level which deviates from the reference level by an amount representative of the slope of the remnant dark current signal.

Figure 6:
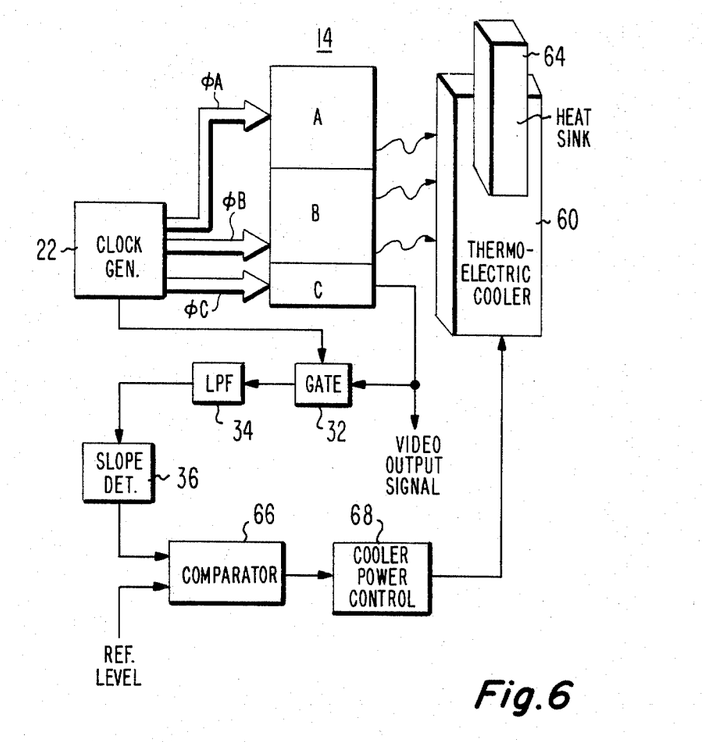
FIG. 6 illustrates in block diagram form a portion of a CCD camera including a dark current slope detector for deriving an indication signal in accordance with the principles, of the invention for controlling a thermoelectric cooler.

As previously noted, field shading due to dark current response can also be controlled by controlling the temperature of the solid-state imager, which affects the amount of dark current. The above-noted measurement technique of integrated dark current can be used for deriving the necessary temperature control signal. FIG. 6 illustrates a portion of a solid-state imager camera including a thermoelectric cooler 60 for reducing the temperature of imager 14 in order to reduce the amount of field shading due to dark current response. Portions of FIG. 6 which are similar to portions previously described with respect to FIG. 1, are indicated by like reference number and will not be discussed. Cooler 60 is thermally associated with imager 14 (e.g., by bonding with thermally conductive epoxy, not shown) for removing thermal energy (indicated by wavy arrows 62) therefrom. Cooler 60 is conventional in design and removes thermal energy from imager 14 in accordance with the current flow through cooler 60. In turn, cooler 60 has a thermal connection to a heat sink 64, such as a copper bar or braid. Details of the way in which a solid-state imager has been used together with a thermoelectric cooler so as to avoid problems of condensation on the imager are described in U.S. patent application Ser. No. 532,957 entitled, "Camera with Reduced-Condensation Cooled CCD Imager", filed Sept. 16, 1983 in the name of P. D. Southgate, and assigned to RCA Corporation.

The previously described accurate dark current and/or temperature indication signal supplied from slope detector 36 is applied to a comparator 66 for comparing against a reference level for developing an error signal. This error signal is applied to a cooler power control 68 for controlling the power draw of cooler 60 and completing a degenerative feedback loop which regulates the cooling and hence, dark current response, of imager 14. Preferably, imager 14 is cooled to reduce dark current response below a predetermined average level, as determined by the factory setting of the reference level applied to comparator 66.

Figure 7:
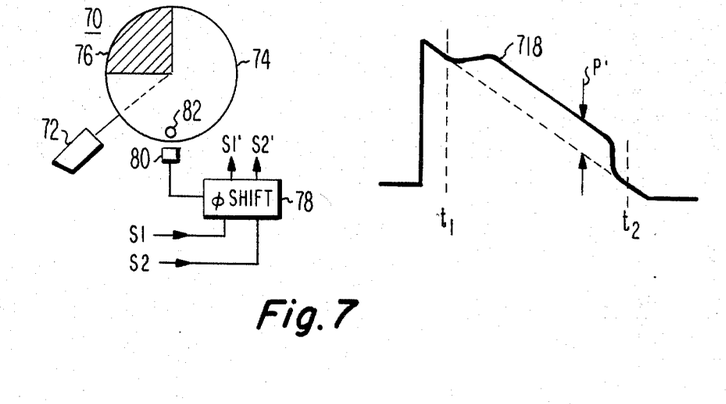
FIG. 7 illustrates in block diagram form a portion of a CCD camera including an image shutter and a signal waveform useful in understanding the principles of the present invention when used in a television camera including a rotating image shutter.

FIG. 7 illustrates a rotary optical shutter 70 which may be used with a solid-state imager camera. A solid-state imager camera having zero lag is particularly useful for imaging fast moving objects. With such a zero lag device it is feasible to use optical shuttering to enhance the dynamic resolution of the camera. Periodically interposing a mechanical shutter (such as a rotating wheel) between the camera optics and the imager optically blocks incoming radiant energy from reaching A register 16 during pull-down and substantially eliminates a well-known phenomena, called vertical "smear", which occurs when incident radiation is not blocked from the reaching imager during the pull-down interval. Shutter 70 is driven by a motor 72 and comprises a radiation (light) passing portion 74 which occupies 75% of its area and a radiation blocking portion 76 which occupies 25% of its area. Shutter 70 is rotated at a rate synchronous with the pull-down interval such that the blocking portion 76 shields imager 14 from receiving radiant scene energy during the entire pull-down interval. Since 100% of the pull-down interval is blocked from incident radiation, shutter portion 76 partially covers imager 14 during the beginnings and ends of the image integration field intervals. Consequently, the amount of radiation leakage onto B register 18 during vertical trace intervals is also affected, causing a level variation in the pedestal portion of the remnant dark current signal, which affects the pedestal-plus-ramp as illustrated by waveform 718 of FIG. 7. As illustrated thereby, there is no pedestal level at the beginning and end portion of waveform 718, but, the portion in between these portions has a DC pedestal level which gradually changes to a level indicated as P', which level corresponds to the DC pedestal level P of waveforms 316.

When the principles of the present invention are applied to a solid-state imager camera including a shutter, the sampling pulses S1 and S2 (used in conjunction with FIGS. 4 and 5) are re-timed to occur in synchronism with the movement of the shutter such that an accurate measurement of the slope can be calculated. Sampling pulses S1 and S2 are synchronized with the movement of shutter 70 for sampling the remnant dark current signal at times t1 and t2, indicated on waveform 718. This will prevent an erroneous dark current response measurement due to sampling of the remnant signal at times when it has differing pedestal levels due to the movement of shutter 70. Sampling pulses S1 and S2 are synchronized to the movement of shutter 70 by phase shifting circuitry 78. Phase shifter 78 senses the angular position of shutter portion 76 using, for example, a magnetic sensor 80, and a magnet 82 mounted at an appropriate portion of shutter 70, for generating re-phased sampling pulses S1' and S2'. Samping pulses S1' and S2' may then be used as the sampling pulses in the FIG. 4 or 5 embodiments.

It should be appreciated that means other than those described with reference to FIGS. 4 and 5 can be used for sensing the slope of the remnant dark current signal. For example, instead of clamping the remnant dark current signal to a reference level at time t1 and sampling the signal again at time t2 to determine its slope, the remnant dark current signal can be clamped to a reference level and the signal portion between $t_1$ and $t_2$ can be unclamped and integrated. This technique of determining a DC level signal responsive to the slope of the remnant dark current signal (and also imager temperature) is shown in FIG. 8.

Slope detector 836 includes a clamp including a capacitor 808 and a FET switch 810 rendered nonconductive in the interval $t_1$–$t_2$ by a signal 812 clamping remnant dark current signal 814 to a reference voltage ($-V_{ref}$) at a node 816. Signal 812 causes switch 810 to clamp node 816 to $-V_{ref}$ at all times except during the $t_1$–$t_2$ time interval. The signal at node 816 is illustrated by waveform 814'. Signal 812 can be generated by a flip-flop (not shown) responsive to the S1 and S2 sampling pulses supplied from clock generator 22 of FIG. 1. Slope detector 836 also includes a Miller integrator 817 including an integrator amplifier 818 having its inverting signal input coupled to node 816 and its non-inverting signal input coupled to $-V_{ref}$. The output of amplifier 818 is coupled to its inverting input by a Miller capacitor 820. An FET switch 822 is responsive to a narrow pulse signal, illustrated by waveform 824, which is timed to occur somewhere between the leading edge of field blanking (illustrated by waveform 826) and the beginning of the pull-down interval, for recurrently discharging capacitor 820 in preparation for a new integration interval. During the $t_1$ to $t_2$ time interval, integrator 817 develops across capacitor 820 a voltage corresponding to the shaded area 828 on waveform 814'. During the remainder of the field interval (until the next pulse from waveform 824) integrator 817 holds at its output (node 830) the DC signal level which was reached at the end of the $t_1$ to $t_2$ time interval.

This DC signal (which corresponds to the indication signal developed at the output of detector 36 of FIG. 1) is responsive to the slope of the ramp portion of the remnant dark current signal 814 and, due to the clamping action of switch 810, the DC signal generated by integrator 817 is independent of the pedestal level of the remnant dark current signal.

A ramp generator 840 and a pedestal generator 842 are responsive to the DC level (indication signal) developed at node 830 for providing ramp and pedestal shading correction signals having a controlled slope and amplitude level, respectively, as indicated by waveforms 320 and 318 of FIG. 3, to a conventional 3-input signal adder 832. Pedestal generator 842 simply comprises an inverting amplifier 844 followed by a variable resistor 845 for providing a portion of the DC level of the indication signal to adder 832. Ramp generator 840 comprises a Miller integrator 846 identical to integrator 817 except that it is referenced to signal ground and an FET switch 848 is responsive to vertical blanking signals, waveform 826, for recurrently discharging the Miller capacitor 850. Capacitor 850 charges at a rate responsive to the difference between the DC level at node 830 and signal ground. Consequently, a negative-going ramp signal, such as indicated by waveform 320 of FIG. 3, is developed at the output of integrator 840. A variable resistor 852 follows integrator 840 and supplies the ramp signal to adder 832 with a slope that varies in response to the DC signal level developed at node 830, which, as previously noted with respect to FIGS. 4 and 5, is temperature-dependent. Variable resistors 845 and 852 apply the generated pedestal and ramp correction signals to the negative input of an amplifier 834 of signal adder 832 with an amplitude adjusted during factory setup at room temperature, for best cancellation of the pedestal and ramp field shading components (illustrated by waveforms 310 and 312 of FIG. 3) which undesirably accompany the video signal. The video signal from the output of pre-processor 23 is also applied to the negative input of amplifier 834 via a resistor 836. Consequently, a shading corrected video signal is provided at the output of amplifier 856.

Thereafter, changes in field shading due to changes in imager temperature are reflected by changes in the DC level at node 830. Ramp and pedestal generators 840 and 842 are responsive to the DC level at node 830 for changing the level of the pedestal and the slope of the ramp so as to continuously track the changes in field shading.

Although the described embodiments include a solid-state imager of the vertical field-transfer type, the principles of the invention are also applicable to other types of imagers which include a transfer area, such as the vertical-interline type of imager. Furthermore, although only a single imager is utilized in the described television camera, clearly multiple imagers, e.g., each responsive to a different color, can be included in a color television camera and a measurement of dark current response from one of the imagers, such as the green light sensitive imager can be used for field shading correction or thermal cooler control for one or all of the images. Additionally, although sampling pulses S1 and S2 are shown occurring near the beginning and end, respectively of the recurrent pull-down intervals it may be desirable for them to occur more towards the middle of the pull-down interval so as to avoid portions of the remnant dark current signal which may contain information other than dark current. For example, as previously noted, although the A register includes 256 lines of charge samples, less than 256 lines are readout from the B register during the active picture interval. Thus, several lines at the beginning of the remnant dark current signal may be contaminated with charge samples representative of the incident radiation.

What is claimed is:

1. In a television camera including a solid-state imager of the field-transfer type having a first area responsive to scene radiation for developing fields of video samples descriptive of said scene and a second area substantially blocked from said scene radiation for supplying at an output said fields of video samples one line at a time in raster scan order, means for determining the amount of dark current integrated in said second area, comprising:

clock means for supplying clocking signals to said first and second areas for establishing recurrent first intervals during which present fields of video samples descriptive of said scene radiation are developed in said first area while prior developed fields of video samples are line sequentially supplied from the output of said second area, and for establishing recurrent second intervals during which said present fields of video samples are transferred from said first area to said second area and during which remnant signal is supplied at the output of said second area, said remnant signal including a variable pedestal portion and a ramp-like portion representative of dark current integrated in said second area during said recurrent first intervals; and slope responsive means coupled to receive said remnant signal for generating an indication signal having a level responsive to the slope of said ramp-like portion of said remnant signal and substantially unresponsive to the variable pedestal portion of said remnant signal.

2. A television camera according to claim 1 wherein said slope responsive means comprises a first sample-and-hold circuit for sampling said remnant signal near the beginning of said recurrent second intervals, a second sample-and-hold circuit for sampling said remnant signal near the end of said recurrent second intervals and a subtracting circuit for forming a difference signal in response to the samples held by said first and second sample-and-hold circuits, respectively.

3. A television camera according to claim 2 including a third sample-and-hold circuit coupled to the output of said subtracting circuit for providing as said indication signal a sample of said difference signal.

4. A television camera according to claim 1 including pulse generating means coupled to said clock means for supplying a first timing signal nearer the beginning of said recurrent second intervals and a second timing signal nearer the end of said recurrent second intervals.

5. A television camera according to claim 4 wherein said slope responsive means includes means responsive to said first and second timing signals for generating first and second samples of said remnant signal.

6. A television camera according to claim 5 wherein said slope responsive means includes a subtracting circuit having inputs coupled to receive said first and second samples for forming a difference signal representative of the slope of the ramp-like portion of said remnant signal.

7. A television camera according to claim 4 wherein said slope responsive means includes a clamp circuit responsive to the first timing signal for providing at an output a DC level shifted version of said remnant signal which is able to vary from a reference level and a further means coupled to the output of said clamp circuit and responsive to said second timing signal for establishing a DC signal level representative of the deviation of said level shifted remnant signal from said reference level during the time interval between said first and second timing signals.

8. A television camera according to claim 5 wherein said further means comprises a sample-and-hold circuit responsive to said second timing signal for sampling said level shifted remnant signal at said clamp output.

9. A television camera according to claim 1 including field shading correction circuitry responsive to the level of said indication signal generated by said slope responsive means for generating a controllable black level correction signal for correcting field shading due to dark current integrated in said second area while said prior developed fields are being line sequentially supplied.

10. A television camera according to claim 9 wherein said field shading includes a ramp-like signal component and said field shading correction circuitry comprises a signal generator responsive to said indication signal for generating as said black level correction signal a field duration ramp-like signal having the same slope but opposite polarity as the ramp-like signal component of said field shading.

11. A television camera according to claim 10 wherein the slope of said black level correction signal is responsive to the level of said indication signal so as to track the slope of the ramp-like signal component of said field shading.

12. A television camera according to claim 11 wherein said field shading also includes a variable level pedestal component and said field shading correction circuitry includes a pedestal generator responsive to said indication signal for generating a pedestal signal having a level which tracks the level of said field shading pedestal component but at an opposite polarity.

13. A television camera according to claim 11 including combining means for combining said generated field duration ramp-like signal component from said field-shading correction circuitry with said video samples supplied from said second area for substantially cancelling said ramp-like component of said field shading.

14. A television camera according to claim 1 further including:
thermoelectric cooling means for cooling said solid-state imager; and
means responsive to said indication signal for controlling the amount of power supplied to said thermoelectric cooler, whereby the temperature of said solid-state imager is modified and consequently the amount of dark current generated within said solid-state imager is accordingly controlled.

15. A television camera comprising:
a solid-state imager of the type having an unmasked portion responsive to radiation from a scene projected thereon for recurrently developing present fields of video samples in raster scan order and a masked portion of said imager substantially blocked from said scene radiation, but subject to partial radiation leakage, for storing previously developed fields of video samples, wherein said previously developed fields described by said video samples undesirably include field shading components due to dark current integration in said masked portion of said imager;
controllable clock means for supplying clocking signals to said masked and unmasked portions of said imager for establishing recurrent first intervals during which individual fields of video samples are transferred from said unmasked portion to said masked portion and recurrent second intervals during which said transferred fields of video samples are supplied from an output of said masked portion in line sequential raster scan order while a new field of video samples is developed in said unmasked portion;
signal processing means responsive to said supplied video samples for developing video signals descriptive of said scene; and
means for measuring a remnant signal supplied at the output of said masked portion during said recurrent first intervals, said remnant signal comprising a ramp-like signal component representative of integrated dark currents developed in said masked portion during said recurrent second intervals and a pedestal portion which varies in level in accordance with the amount of scene radiation leakage to said masked portion during said recurrent second intervals, said measuring means including slope responsive means for providing a signal level responsive to the slope of said ramp-like portion of said remnant signal, and means for developing correction signals from said signal level provided by said slope responsive means for application to said signal processing means for reducing said undesirable field shading.

16. A television camera according to claim 15 wherein said field shading includes a field duration ramp-like signal component and said means for developing correction signals comprises a ramp generator for generating ramp-like signals of field duration having a slope responsive to said signal level provided by said slope responsive means and a polarity for cancelling the ramp-like component of said field shading.

17. A television camera according to claim 16 wherein said field shading includes a field duration DC pedestal signal component and said means for developing correction signals comprises a pedestal generator for generating pedestal signals of field duration having a DC level responsive to the signal level provided by said slope responsive means and a polarity for cancelling the pedestal component of said field shading.

18. In a television camera including a solid-state imager of the frame transfer type having an active area for sequentially developing fields of video samples representative of radiation from a scene and a storage area from which prior developed fields of video samples are line sequentially supplied at its output but contaminated with undesired field shading due to dark currents integrated in said storage area of the imager, means for deriving a signal representative of dark currents integrated in the storage area of said imager comprising:
signal separation means coupled to the output of said storage area for providing at an output a remnant signal supplied from said storage area after a substantial portion of each field of video samples is supplied from said storage area; and
slope responsive means coupled to the output of said separation means for developing an indication signal having a level responsive to the slope of said remnant signal.

19. A television camera according to claim 18 including field shading correction circuitry for generating a black level correction signal having a level responsive to said indication signal for substantially cancelling sid field shading due to dark current integrated in said storage area.

20. Apparatus according to claim 19 wherein said field shading correction circuitry comprises a signal generator for developing field duration ramp-like signals having the same slope but opposite polarity as said field shading due to dark current integrated in said storage area.

21. In a television camera including a solid-state imager of the frame transfer type having an active area for sequentially developing fields of video samples representative of radiation from a scene and a storage area from which prior developed fields of video samples are line sequentially supplied at its output but contaminated with undesired field shading due to dark currents integrated in said storage area of the imager, a method for deriving an indication signal representative of dark currents integrated in the storage area of said imager, said method comprising:

supplying from said storage area a remnant signal after a substantial portion of each field of video samples has been supplied from said storage area; and developing an indication signal having a level responsive to the slope of said remnant signal.

* * * * *